United States Patent [19]

Bradley

[11] Patent Number: 4,562,467
[45] Date of Patent: Dec. 31, 1985

[54] DATA COMPRESSION APPARATUS AND METHOD FOR ENCODING AND DECODING MULTI-LINE SIGNALS

[75] Inventor: William C. Bradley, Sudbury, Mass.
[73] Assignee: Itek Corporation, Lexington, Mass.
[21] Appl. No.: 481,222
[22] Filed: Apr. 1, 1983
[51] Int. Cl.[4] .............................................. H04N 1/41
[52] U.S. Cl. .................................... 358/135; 358/138; 375/27
[58] Field of Search ....................... 358/133, 135, 138; 375/27

[56] References Cited

U.S. PATENT DOCUMENTS

| | | | |
|---|---|---|---|
| 4,155,097 | 5/1979 | Lux | 358/135 |
| 4,238,768 | 12/1980 | Mitsuya | 358/135 |
| 4,369,463 | 1/1983 | Anastassiou | 358/135 |

Primary Examiner—Howard W. Britton
Attorney, Agent, or Firm—Michael H. Wallach; Robert F. Rotella

[57] ABSTRACT

Apparatus and method for encoding and decoding a signal which is divided into a plurality of signal lines, each of which is a successive line of pixel signal values taken from a two-dimensional informational field. The apparatus for encoding includes the following elements: means for deriving a neighborhood value representing the pixel signal values taken from the two-dimensional field in the neighborhood of a pixel signal value to be encoded, which neighborhood value is based, at least in part, on a pixel signal value in another signal line than that in which the pixel signal value to be encoded is located; means for deriving the difference between the neighborhood value and the pixel signal value to be encoded; and means for outputting the difference as the encoded representation of the pixel signal value to be encoded. In an alternative embodiment of the apparatus for encoding, the means for deriving a neighborhood value bases the neighborhood value on an average of at least two of the signal values from the neighborhood of the pixel signal value to be encoded.

7 Claims, 8 Drawing Figures

DATA COMPRESSION APPARATUS AND METHOD FOR ENCODING AND DECODING MULTI-LINE SIGNALS

FIELD OF INVENTION

This invention relates to an apparatus and method for encoding and decoding a signal, such as a television signal or the output from a time delay and integrate imaging charge-coupled device, which is divided into a plurality of signal lines, each of which is a successive line of pixel signal values taken from a two-dimensional information field, and more particularly to such an apparatus and method in which a given pixel signal value is represented in a data compressed form by a difference between its value and a value representing neighboring pixel signal values in the two-dimensional information field.

BACKGROUND OF INVENTION

It is common in the art of information communication to transmit and receive signals which are divided into a plurality of signal lines, each of which is a successive line of pixel signal values taken from a two-dimensional information field. For example, television signals are divided into a plurality of horizontal line intervals, each of which is a successive line of light intensity values from a two-dimensional video field, or image, composed of such values. Facsimile signals are also composed of signal lines, each of which represents one line of varying light intensity values scanned across the image being transmitted. Linear or time delay and integrate (TDI) imaging charge-coupled devices (CCDs), such as those used for airborne reconnaissance, commonly generate a signal which is divided into a plurality of signal lines. TDI imaging CCDs are commonly constructed out of a plurality of closely spaced, parallel TDI CCD shift registers built on a photoelectric semiconductive substrate. Such devices have been designed to have an optical image scanned across the surface of their substrate along the length of their TDI shift registers and to have those shift registers clocked in synchronism with the motion of the optical image. This is done so that electrons which are freed under one of the TDI shift registers by the photoelectric effect of light in a given portion of the optical image are attracted into a charge packet that will be moved along by the TDI shift register in conjunction with that given portion of the optical image. When a charge packet reaches the end of its associated TDI shift register it is fed, in parallel with all of the other charge packets which have reached the end of their associated TDI shift registers at the same time, into an output CCD shift register. The output shift register then rapidly shifts out all of the charge packets fed to it, so as to provide a series of charge packets, the variable charge levels of which correspond to the variable light intensity of a line taken from the two-dimensional optical image scanned across the TDI imaging CCD.

When transmitting signals which are divided into a plurality of signal lines, each of which is a successive line of pixel signal values taken from a two-dimensional information field, it is often desirable to communicate each pixel signal value with considerable accuracy. For example, TDI imaging CCDs can easily be constructed which produce pixel signal values with an accuracy that requires eight binary bits to represent (a greater or lesser number of bits can also be used). Representing each pixel signal value with so many binary bits has the benefit of conveying a greater amount of information about the image from which the signal was derived, but it has the unfortunate effect of increasing the amount of time or channel capacity required to transmit the signal and of increasing the amount of memory required to store the signal if such storage should be desired. Therefore it is desirable to find a way to compress the amount of data required to represent such a multiline signal without greatly decreasing the meaningful information it conveys concerning the image from which it was derived.

One method of data compression which has been used in the past is to transmit, instead of the absolute value of a pixel to be transmitted, the value of the difference between the value of that pixel and the one that preceded it. This method results in a data compression because the values of pixels which are next to each other are usually very close in value, particularly if the pixels are closely spaced relative to the size of the features on the image from which they were derived. Thus the number of bits required to represent the difference between the value of such neighboring pixels is less than that required to represent the absolute value of such pixels.

In such a method, the absolute value of a first pixel is transmitted in an uncompressed form, so that the absolute value of a second, succeeding pixel value can be reconstructed by adding to the value of the first pixel the differential value transmitted as the compressed representation of the second pixel. Once the absolute value of the second pixel value has been reconstructed, the absolute value of a third pixel succeeding the second can be reconstructed by adding to the reconstructed absolute value of the second pixel the differential value representing the third pixel. This process of reconstructing absolute pixel value can be repeated for each of a succession of pixel values.

Unfortunately, there are problems involved in using a data compression method which merely transmits the difference between a pixel value and that of its preceding pixel value. For one thing, such a data compression technique is very subject to noise. If the value of a reconstructed pixel value has a given error, whether it be due to noise in the derivation of the original absolute pixel values, in the transmission and reception of the data compressed signal, or in the reconstruction of the absolute pixel values, all succeeding reconstructed pixel values derived from that erroneous pixel value will have their values offset by the full amount of the given error. As a result, one badly reconstructed pixel will cause all succeeding reconstructed pixels after it to also be erroneous until a new absolute pixel value is transmitted in uncompressed form.

SUMARY OF INVENTION

It is therefore an object of this invention to provide an improved data compression apparatus and method for encoding and decoding multi-line signals.

It is a further object of this invention to provide such an apparatus and method which reduce sensitivity to noise.

It is a further object of this invention to provide such an apparatus and method using a differential data compression technique in which the effect of an erroneously reconstructed pixel signal value upon succeeding pixel signal values reconstructed from it is reduced.

It is a further object of this invention to provide such an apparatus and method which is simple in construction and practice.

The invention results from the realization that a differential data compression technique used to transmit a multi-line signal could be made less subject to the ill effects of noise by calculating the differential value in a new way. Instead of basing such a differential value on the difference between a pixel signal value to be encoded and just the one pixel signal value which preceded it, it is possible instead to base such a differential value on the difference between the pixel signal value to be encoded and a value which represents pixel signal values in the neighborhood of the pixel signal value to be encoded. Such a neighborhood value can be based on one or more pixel signal values which are on a signal line other than that of the pixel signal value to be encoded, so that it can be less dependent on errors associated with the line of the pixel signal value to be encoded. And such a neighborhood value can be an average of pixel signal values so that a large error associated with any of those pixel signal values will tend to be averaged out.

The invention features an apparatus and method for encoding and decoding a signal which is divided into a plurality of signal lines, each of which is a successive line of pixel signal values taken from a two-dimensional information field. The apparatus for encoding includes means for deriving a neighborhood value representing the pixel signal values taken from the two-dimensional field in the neighborhood of a pixel signal value to be encoded. The neighborhood value is based, at least in part, on a pixel signal value in another signal line than that in which the pixel signal value to be encoded is located. Means are provided for deriving the difference between the neighborhood value and the pixel signal value to be encoded, and means are also provided for outputting the difference as the encoded representation of the pixel signal value to be encoded. In an alternative embodiment of the apparatus for encoding, the means for deriving a neighborhood value bases the neighborhood value on an average of at least two of the pixel signal values from the neighborhood of the pixel signal value to be encoded. It is preferred that no two of the pixel signal values which are included in such average be taken from opposite sides in the two-dimensional information field of the pixel signal value to be encoded.

The apparatus for decoding includes means for receiving an encoded signal to be decoded and means for deriving a neighborhood value representing reconstructed pixel signal values taken from a two-dimensional information field in the neighborhood of the original signal being decoded. The neighborhood value is based, at least in part, on a determination of a reconstructed signal value corresponding to another signal line than that in which the encoded pixel signal value to be decoded is located. The decoding apparatus also includes means for adding the neighborhood value and the encoded pixel signal value to be decoded and means for outputting the resultant sum as a reconstruction of the signal value to be decoded. In a preferred embodiment the means for deriving a neighborhood value includes means for receiving, as the reconstruction of a signal value on the basis of which it derives the neighborhood value, a previously decoded encoded pixel signal value. In an alternative embodiment the means for deriving a neighborhood value bases the neighborhood value on an average of at least two determinations of reconstructed signal values taken from the neighborhood of the reconstructed signal value corresponding to the encoded pixel signal value to be decoded.

In another embodiment of the invention the apparatus for encoding includes memory means, for example a shift register, for storing at least approximately one line of successive pixel values. Means are provided for reading from the memory means a set of stored pixel values which are adjacent in a two-dimensional image to the pixel value to be encoded. Means are provided for deriving an average of the set of pixel values read from the memory means. And means are provided for deriving the difference between the average so derived and the pixel value to be encoded. The set of pixels read from memory includes the pixel which immediately precedes the pixel to be encoded as well as the three pixels on the preceding picture line which are closest to the pixel to be encoded.

In a corresponding embodiment of the invention, the decoding apparatus includes means for receiving an encoded pixel value to be decoded and memory means, for example a shift register, for storing a succession of decoded pixel values corresponding to encoded pixel values previously received and decoded. The decoding apparatus also includes means for reading from the memory means a set of stored decoded pixel values which correspond to reconstructed pixel values which are adjacent in a two-dimensional image to the pixel value to which the encoded pixel value to be decoded corresponds. The decoding apparatus further includes means for deriving an average of the set of decoded pixel values read from the memory means, means for deriving a sum of the resulting average and the encoded pixel value to be decoded, and means for outputting the sum as the decoded pixel value corresponding to the encoded pixel value to be decoded.

DISCLOSURE OF PREFERRED EMBODIMENT

Other objects, features and advantages will occur from the following description of a preferred embodiment and the accompanying drawings, in which.

Figure 1A:
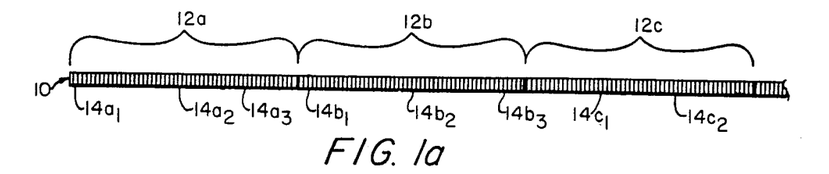
FIG. 1a is a diagrammatic representation of a multi-line signal of a type which can be encoded and decoded by the invention.

In FIG. 1a a diagrammatic representation of a multi-line signal 10, such as might be produced by a CCD imaging device, is shown. The signal 10 is divided into a plurality of successive signal lines 12a, 12b and 12c each of which is in turn divided into a plurality of pixel signal values, for example 14a₁, 14a₂ and 14a₃. The signal 10 is derived from a two-dimensional image 16 shown in FIG. 1b. Each of the successive signal lines 12a, 12b, 12c, etc. constitutes a successive horizontal picture line, and each of the pixel signal values 14a₁ for example, constitutes a pixel value, taken from the image 16. Of course, in actual practice many multi-line signals are composed of many more picture lines per image and many more pixel signal values per picture line than is shown in FIG. 1a. In fact, TDI imaging CCDs have been made for purposes of airborne reconnaissance which produce an image having over ten thousand picture lines of ten thousand pixels each.

Figure 1B:
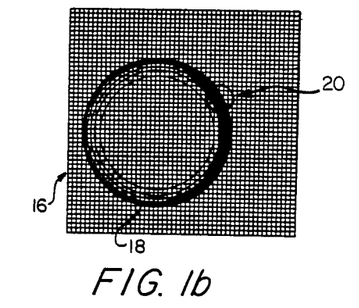
FIG. 1b is a diagrammatic representation of a two-dimensional image from which the signal 10 of FIG. 1a is derived.
Figure 1C:
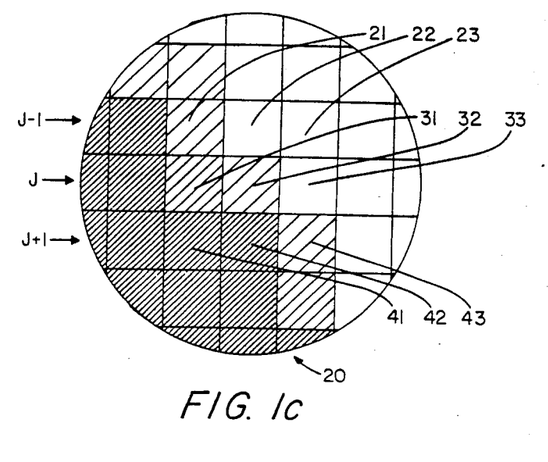
FIG. 1c is an exploded representation of a portion of the image of FIG. 1b.

In FIG. 1b the image 16 is shown depicting a sphere 18. A region 20 of pixel values taken from a portion of the image showing part of the edge of sphere 18 is depicted in an expanded manner. As can be seen in FIG. 1c, the pixel values of the region 20 are arranged in a row by column matrix, so that a given pixel value 32 is surrounded in the two-dimensional image 16 by eight neighboring pixel values 21, 22, 23, 31, 33, 41, 42, and 43, which are adjacent to it. Two of these neighboring pixel values, 31 and 33, are on the same picture line J as is pixel value 32, with pixel value 31 immediately preceding and pixel value 33 immediately following pixel value 32 in signal 10. And three of these neighboring pixel values, 21, 22, and 23, are on the picture line J−1 which precedes in signal 10 the picture line J in which pixel value 32 occurs. Similarly, three neighboring pixel values 41, 42 and 43 occur in the picture line J+1 which follows the picture line J. In FIG. 1c the number of diagonal lines shown in each of the pixel values of neighborhood 20 is used to roughly represent the signal level of that pixel value. It should be noted that in actual practice the grid of pixel values is often much finer than that shown in FIG. 1c, so that the transition from dark to light may occur over a greater number of pixel values than is shown in region 20.

According to the present invention, a data compression of signal 10 is achieved by replacing its original pixel values with corresponding encoded pixel values. Each of the encoded pixel values is equal to the difference between the original pixel value it is replacing and a neighborhood value which represents other original pixel values from the image 16 in the neighborhood of the original pixel value being replaced.

Figure 2:
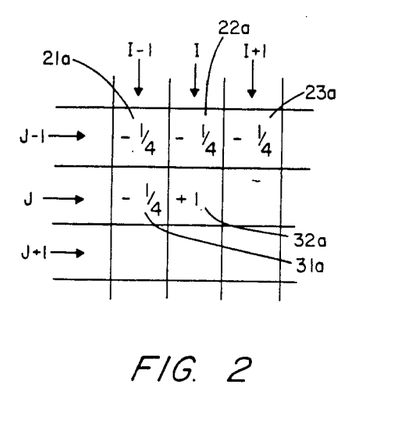
FIG. 2 is a diagrammatic representation of a neighborhood of pixels from a multi-line signal such as that shown in FIG. 1, with weighting values used to derive an encoded pixel value according to a preferred embodiment of the invention.

For example, FIG. 2 shows a neighborhood of pixel values surrounding a given pixel value 32a to be encoded, with numbers indicating the weighting value assigned to each pixel value which is used in deriving an encoded value for pixel value 32a according to a preferred embodiment of the invention. In such a preferred embodiment the neighborhood value used to calculate the encoded pixel value is derived by adding a negative one quarter of pixel value 31a, which is the pixel value which immediately precedes and is on the same picture line J as the pixel value to be encoded 32a, and a negative one quarter of each of the pixel values 21a, 22a, and 23a, which are the three pixel values in the picture line J−1 which are closest to the pixel value to be encoded 32a. The resulting sum is equal to negative one times the average of the four neighboring pixel values 21a, 22a, 23a, and 31a. This negative neighborhood value is added to the pixel value to be encoded, 32a, to produce the difference between the pixel value to be encoded and a representation of pixel values in its neighborhood.

Figure 3:
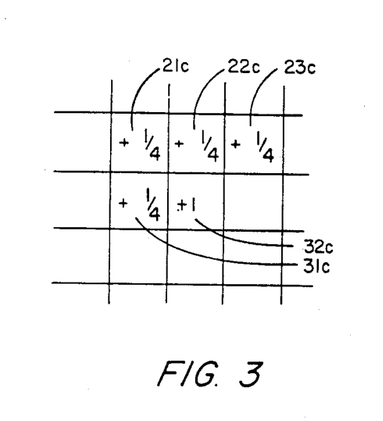
FIG. 3 is a diagrammatic representation of a neighborhood of pixels from a multi-line signal such as that shown in FIG. 1, with weighting values used to derive a decoded pixel value according to a preferred embodiment of the invention.

As is indicated by FIG. 3, the decoding process is very similar to the encoding process, except that instead of subtracting an average of neighboring pixel values from a pixel value to be encoded, an average of previously decoded pixel values are added to the encoded pixel value to be decoded. The decoded or reconstructed signals are generally close but not identical with the original pixel signal values due to noise and error conditions. Thus an encoded pixel value 32c, corresponding to the original pixel value 32a of FIG. 2, is decoded by adding it to a determination of the decoded value of the neighborhood whose original neighborhood value was subtracted from pixel value 32a to derive the encoded pixel value 32c. The determination of the neighborhood value used in decoding is an average of the four determinations 21c, 22c, 23c, and 31c of the original pixel values 21a, 22a, 23a, and 31a, respectively, which were averaged in deriving the neighborhood value used in encoding. The average of the four determinations 21c, 22c, 23c and 31c is derived by taking a sum of one quarter times each of those determinations, as indicated in FIG. 3. Usually the determinations 21c, 22c, 23c, and 31c are derived by previously decoding the encoded pixel values corresponding to their original pixel values 21a, 22a, 23a and 31a, respectively. But in those instances, which are discussed below in greater detail, when one or more of the pixel values are transmitted in their unencoded form, such determinations of corresponding pixel value are made by merely reading the transmitted unencoded original pixel value, and no decoding is required.

Of course it is possible according to the present invention to use a different pattern of weighting values in encoding and decoding pixel values than that shown in FIGS. 2 and 3, but the pattern of weighting values shown in those figures has proven particularly advantageous for several reasons. First of all, the pattern of FIGS. 2 and 3 has an advantage over patterns which base the neighborhood value on a fewer number of neighboring pixel values, because with the four neighboring pixel values in FIGS. 2 and 3, errors, such as those caused by random noise, associated with each of the neighboring pixel values tend to average out in both encoding and decoding. This averaging effect is particularly important in the process of decoding, since in decoding each successively decoded pixel value is dependent on pixel values decoded before it. With the weighting pattern shown in FIG. 3, each successively decoded pixel value is derived from four previously decoded pixel values. Thus if any one decoded pixel value is erroneous, the decoded pixel values derived from it are only affected by one quarter of its error, and subsquently decoded pixel values are affected by its error to even less, so that as one moves further away from such an erroneous 14 decoded pixel value the effect of its error diminishes.

Another advantage of the pattern of weighting values shown in FIGS. 2 and 3 is that no two of the pixel values which are averaged in the derivation of their neighborhood values are taken from opposite sides in the image 16 of the pixel value to be encoded or decoded. Although it might appear at first glance that it would be beneficial to calculate a neighborhood value as an average of all of the pixel values which surround a given pixel value to be encoded or decoded, experience has indicated to the inventor that this is not the case. Neighborhood values that include both sides of the pixel value to be encoded produce decoded images which have a high amount of noise. It is believed that this increase in noise results because neighborhood values derived from pixel values taken from both sides of a pixel value to be encoded have properties of a second derivative and thus greatly enhance the high-frequency components of the noise in the image being encoded and decoded.

A further advantage of the weighting pattern shown in FIGS. 2 and 3 is that since each of the pixel values which is included in the determination of their neighborhood values precede in signal 10 the given pixel value to be encoded or decoded, there is no need to delay the encoding or decoding of such a given pixel for the receipt and decoding of subsequent pixel values. Not only does the avoidance of such a delay increase the speed with which a signal can be encoded and decoded, but it also has the beneficial effect of doing away with the need to have memory to store extra pixel values as a result of such a delay. These equations were arrived at empirically. Other equations, found either empirically or analytically, will occur to those skilled in the art and may be implemented by the hardware described here by altering the tap weightings.

Figure 4:
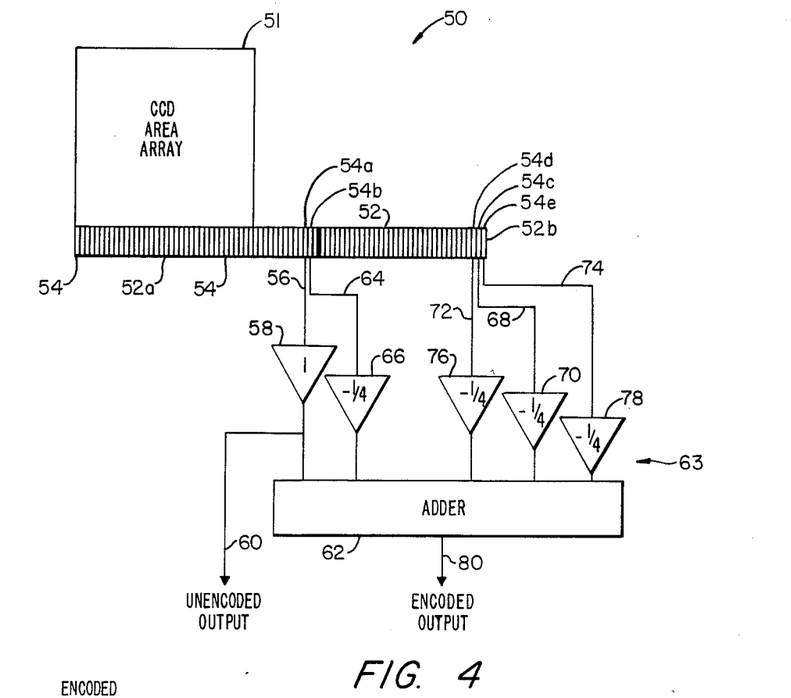
FIG. 4 is a diagrammatic representation of apparatus for encoding a multi-line signal according to the preferred embodiment of the invention discussed with regard to FIG. 2.

In FIG. 4 a diagrammatic representation of an apparatus 50 for encoding signal 10 according to the weighting pattern of FIG. 2 is shown. Such an apparatus can be placed on one semiconductive substrate. The apparatus 50 includes a CCD area array 51, such as that of a TDI or linear imaging CCD, which supplies to a CCD shift register 52 a succession of picture lines, each of which contains a succession of analog pixel values. The shift register 52 contains more than twice as many shift stages 54 as there are pixel values in each of the picture lines produced by the area array 51. In the portion 52a of the shift register 52 which is located under the area array 51 there is one shift stage 54 for each pixel value of a picture line. These shift stages receive in a parallel manner from the area array 51 (or linear array) each successive line of the signal 10 and shift those picture lines in a serial fashion toward the decoding end 52b of the shift register 52.

The decoding end 52b of the shift register 52 has at least one more shift stage 54 than a picture line of signal 10 has pixel values. A lead 56 connects a shift stage 54a, which contains the pixel value to be decoded 32a, shown in FIG. 2, to the input of an analog buffer amplifier 58, which multiplies the signal supplied to it by one. The output of the buffer amplifier 58 is connected to an output lead 60 and also to one input of adder 62.

A lead 64 connects shift stage 54b, which contains the pixel value 31a immediately preceding the pixel value to be encoded 32a, to the input of a multiplying amplifier 66. A lead 68 connects shift stage 54c, which is located further along the shift register 52 from the shift stage 54a by a number of shift stages corresponding to the number of pixel values in one picture line, to the input of a multiplying amplifier 70. The shift stage 54c contains the pixel value 22a shown in FIG. 2. Similarly, leads 72 and 74 connect shift stages 54d and 54e, respectively, to the inputs of multiplying amplifiers 76 and 78 respectively. Shift stages 54d and 54e are the shift stages that immediately succeed and precede, respectively, the shift stage 54c in the shift register 52, and they contain the pixel values 23a and 21a shown in FIG. 2, respectively. All of the multiplying amplifiers 66, 70, 76 and 78 multiply the analog values supplied to them by minus one quarter, and the output of each of them is connected to an input adder 62.

In operation, the adder 62 and the amplifiers which are connected to its inputs operate as a subtracting circuit 63, with the input of the buffer amplifier 58 constituting a minuend input of the subtracting circuit and the inputs of the multiplying amplifiers 66, 70, 76 and 78 constituting the subtrahend inputs of subtracting circuit 63. The lead 56 receives the signal level of the pixel value 32a to be encoded and supplies it to the minuend input of subtracting circuit 63, and the leads 64, 68, 72 and 74 read the signal levels of the pixel values 31a, 22a, 23a, and 21a, respectively, contained in the shift stages to which they are connected and supply them to the subtrahend inputs of subtracting circuit 63. As a result, adder 62, in conjunction with the multiplying amplifiers 66, 70, 76, and 78 derives a neighborhood value which is an average of the pixel values 21a, 22a, 23a and 31a, and derives the difference between that neighborhood value and the pixel value to be encoded 32a. The difference is then supplied to the output 80 of adder 62 as the encoded representation 32c of pixel value 32a.

The output lead 60 receives the pixel value 32a from the output of buffer amplifier 58 in unencoded form. A multiplexer may be used to switch between supplying unencoded pixel values from output 60 and encoded pixel values from output 80 to form the encoded version of signal 10, which is transmitted to a corresponding decoding circuit. It is necessary to send unencoded pixel values at the beginning of a transmission because without them a decoder has no way to determine the neighborhood value that should be added to each encoded pixel value in order to decode it. With the apparatus of FIG. 4, the entire first picture line of an image is transmitted in unencoded form. It is usually necessary to occasionally send unencoded pixel values so that noise in the generation, transmission and reception of pixel values will not cause the decoded pixel values to diverge too greatly from the original pixel values to which they correspond. This is done, for example, by transmitting a line of unencoded pixel values every 128th line or by transmitting the first pixel in each picture line in unencoded form. Typically, before transmission the analog values output on lines 80 and 60 are converted to digital values.

Figure 5:
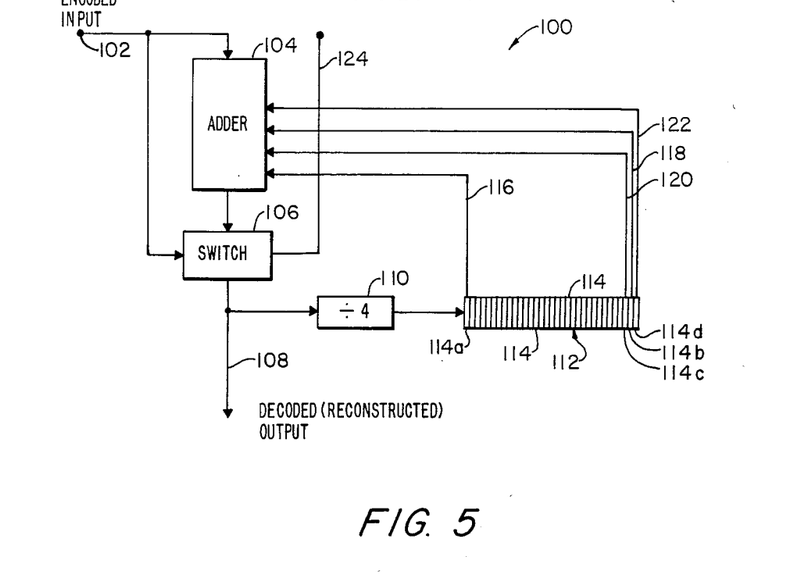
FIG. 5 is a diagrammatic representation of apparatus for decoding a multi-line signal according to the preferred embodiment of the invention discussed with regard to FIG. 3.

In FIG. 5 a diagrammatic representation of an apparatus 100 for decoding an encoded signal 10 according to the weighting pattern of FIG. 3 is shown. The apparatus 100 includes an input 102 which receives encoded pixel values in digital form and which is connected to an input of a digital adder 104. The output of the adder 104 is normally connected through a switch 106 to an output 108 and to the input of a digital divider 110 which divides by four the decoded values supplied to it. The output of the divider 110 is connected to the shifting input of a shift register 112, which has a number of shift stages 114 equal to one plus the number of pixel values in one picture line. The first shift stage 114a of shift register 112, the shift stage closest to the shifting input of that shift register, is connected by a data path 116 to an input of the adder 104. A shift stage 114b of shift register 112, which is removed from the shift stage 114a by a number of shift stages corresponding to one less than the number of encoded pixel values in one picture line, is connected to another input of the adder 104 by a data path 118. And the shift stages 114c and 114d, which immediately succeed and precede, respectively, the shift stage 114b, are connected to further inputs to adder 104 by data paths 120 and 122, respectively.

In operation the input 102 receives a given encoded pixel value to be decoded 32c, shown in FIG. 3, and supplies it to the adder 104. There the encoded pixel value 32c is added to the sum of the four decoded values which are read, respectively, from the shift stages 114a, 114b, 114c, and 114d of the shift register 112 and are suppied to the adder 104 by the data paths 116, 118, 120 and 122, respectively. The resulting decoded pixel value is normally supplied from the output of adder 104 through the switch 106 to the output 108 and to the input of divider 110. The divider 110 supplies the decoded pixel values from the output of adder 104 to the shifting input of the shift register 112 after they have been divided by four. The shift register 112 is clocked so that each successive encoded pixel value which is decoded by adder 104 is shifted into the shifting input of shift register 112 once it has been divided by four, causing all the preceding decoded pixel values which have been stored in the shift register 112 to be shifted one shift stage further away from the shifting input. As a result of this clocking, when the encoded pixel value 32c is applied through the input 102 to the adder 104, one quarter times the decoded pixel value 31c is in shift stage 114a and one quarter times decoded pixel values 21c, 22c, and 23c are in shift stages 114d, 114b and 114c, respectively. The values in these four shift stages are applied to the adder 104 and added by it, to derive a determination of the original neighborhood value which was used to encode the encoded pixel value 32c. This determination of the original neighborhood value is based on the determinations 21c, 22c, 23c and 31c of the original pixel values 21a, 22a, 23a and 31a which are represented by the decoded pixel values stored in a divided form in the shift register 112. As a result, the apparatus shown in FIG. 5 performs a decoding of encoded pixel values according to the weighting values shown in FIG. 3.

The switch 106, besides being connected to the output of adder 104, is also connected to the input 102. A control line 124 is supplied to the switch 106 to control whether the switch 106 connects the output of adder 104 to the output 108 and the input of divider 110, as it normaly does, or whether it connects the input 102 to the output 108 and the divider 110. The latter connection is made when unencoded pixel values are received at input 102, such as occurs when the decoder 100 is being initialized or when unencoded pixel values are transmitted to prevent successive decoded pixel value outputs from adder 104 from deviating too far, as a result of noise, from their corresponding original pixel values. Since such unencoded pixel values equal the original pixel values to which they correspond, they require no further decoding. Therefore they are supplied by switch 106 directly to the output 108 and they are also supplied to the shifting input of shift register 112 through divider 110.

It should be noted that the apparatus of FIGS. 4 and 5 make no distinction between pixel values which occur at the very beginning or end of a picture line and those, such as pixel value 32a, which are both preceded and succeeded by pixel values on the same line. It can be seen from the shift register 52 in FIG. 4 that if a pixel value at the very start of a picture line was to be decoded, and thus was located in shift stage 54a, the pixel value in shift stage 54b would be the last pixel value on the preceding picture line and the pixel value in shift stage 54c would be the last pixel value on the picture line before that. It is clear that the pixel values in shift stages 54b and 54e on such occasions do not come from the same neighborhood of the image 16 as the pixel value to be encoded. Similarly, in decoding it should be clear that the decoded values in shift stages 114a and 114d of shift register 112 in FIG. 5 do not belong to the same neighborhood of a decoded image when the encoded pixel to be decoded comes from the very beginning of a picture line. Nevertheless, the adverse effect caused by the inclusion of such non-neighboring pixel values in the encoding and decoding of pixel values at the beginning of picture lines is slight. However, greater accuracy can be achieved in the decoded signal if each pixel value occurring at the start of a picture line is transmitted in unencoded form.

A similar but lesser problem occurs with the encoding of the last pixel values on each line. When the last pixel value on a signal line is in shift stage 54a of shift register 52 of FIG. 4, the pixel value in shift stage 54d is not a pixel value in the same neighborhood of the image 116 as the pixel value to be encoded, but rather is the pixel value at the very opposite end of the same picture line on which the pixel value to be decoded is located. Similarly, in decoding, when the last pixel value of a picture line is supplied to input 102 the decoded value in shift stage 114c of shift register 112 of FIG. 5 is not in the same neighborhood of the decoded image as the pixel value to be decoded. This has little detrimental effect on the decoded image quality; it could be corrected by sending unencoded values for the last pixel values in each picture line.

The data compression technique of the present invention is best taken advantage of if the differential encoded pixel values are further encoded by the process of binning. The process of binning is applied by taking the range of all the possible difference values which the difference output as the encoded pixel could have and dividing that range up into a plurality of subranges. These subranges are picked so that smaller subranges of possible difference values occur in those portions of the distribution of difference values in which difference values occur with greater probability. Conversely, large subranges of possible difference values occur in those portions of the distribution of difference values in which difference values occur with lesser likelihood. An example is a Huffman Code.

For example, if a pixel value of a given signal could have a value ranging from 0 to 511, then the difference value output by the encoder shown in FIG. 4 could theoretically range from −511 to +511. But in practice it is common for almost half of the difference values to vary between −1 and +1 and for close to all of the difference values to vary between −15 and +15. A crude form of data compression could be performed merely by throwing away difference values which are greater than −15 or +15 and using a 5 bit binary value to represent encoded pixel value or original pixel values which would require 9 bits to transmit without data compression. But binning provides a more efficient way to represent possible difference values. For example, the total range of possible difference values from −511 to +511 can be divided into eight subranges or bins as indicated in the following table:

| Bin Number | Range of Difference Value in Each Bin | Difference Value Use in Decoding |
| --- | --- | --- |
| 1 | +1 | +1 |
| 2 | −1 | −1 |
| 3 | +2 to +6 | +3 |
| 4 | −2 to −6 | −3 |
| 5 | +7 to +15 | +10 |
| 6 | −7 to −15 | −10 |
| 7 | +16 to +511 | +25 |
| 8 | −16 to −511 | −25 |

The difference values of zero can be placed in bin 1 on even-numbered lines and in bin 2 on odd-numbered lines without significantly effecting the readability of decoded images. Thus, each difference value is replaced with a three-bit binary bin number which designates to which of the eight subranges or bins it belongs. On decoding of such a binned signal, the bin number representing each encoded pixel value is converted to an actual difference value from within the corresponding bin, as indicated in the above table.

It has been found that such binning, in conjunction with the encoding technique described in conjunction with FIGS. 2–5, enables a signal comprised of pixel value having 512 possible signal levels to be transmitted with an average of approximately one to three bits per pixel while still maintaining a high degree of decoded image readability. Without data compression it would require nine bits per pixel to transmit such a signal.

Figure 6:
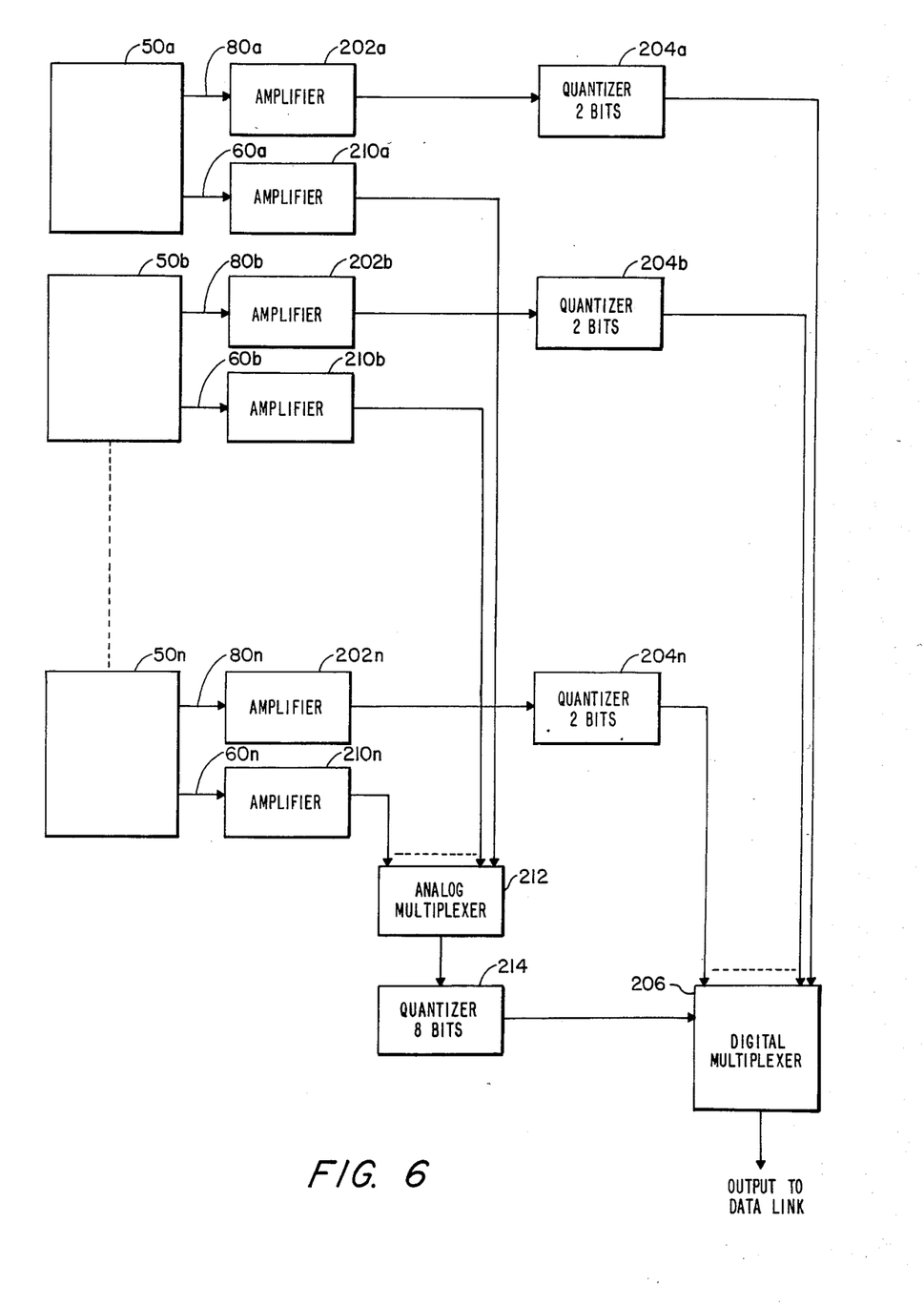
FIG. 6 is a diagrammatic representation of a plurality of apparatus for encoding such as shown in FIG. 4.

FIG. 6 is a diagrammatic representation of a plurality of encoding devices 50a, 50b, . . . 50n, of the type shown in FIG. 4, arranged to operate together. It is common in the art of making imaging CCDs to place a series of linear or TDI CCD chips side by side by one of several common techniques to create a device with a picture line that has a very large number of pixel values, enabling large images with high resolution to be produced.

The encoded outputs 80a, 80b, . . . 80n, respectively, of the encoding apparatuses 50a, 50b, . . . 50n are connected, respectively, through amplifiers 202a, 202b, . . . 202n, to two-bit quantizers 204a, 204b . . . 204n, respectively. The two-bit quantizers 204 are each connected to a separate input of a digital multiplexer 206. The digital multiplexer in turn is connected to the data link over which an encoded signal is to be transmitted. The unencoded outputs 60a, 60b, . . . 60n, respectively, of the encoding apparatuses 50a, 50b, . . . 50n are connected, respectively, through amplifiers 210a, 210b, . . . 210n, to separate inputs of an anlog multiplexer 212. The output of analog multiplexer 212 is connected to an eight-bit quantizer 214, the output of which is connected to a separate input of digital multiplexer 206.

In operation, each encoding apparatus 50 has its analog encoded pixel values which it produces at its output 80 amplified by its corresponding amplifier 202 and quantized, or converted to a digital output, by its corresponding quantizer 204. The quantizer 204 is an analog to digital converter which has a non-linear output function that enables it to perform binning upon the encoded pixel values supplied to it. The two-bit, binned, encoded pixel values produced at the output of each quantizer 204 are fed to the digital multiplexer 206, which multiplexes them with the similar outputs of each of the other two-bit quantizers 204.

The unencoded output 60 of each encoding apparatus 50 is supplied through a corresponding amplifier 210 to an analog multiplexer 212, which supplies one of such unencoded outputs at a time to an eight-bit quantizer 214. The eight-bit quantizer converts an analog unencoded pixel value supplied to it into a corresponding eight-bit digital unencoded pixel value, and supplies that digital value to the digital multiplexer 206, which multiplexes it into the encoded signal which is transmitted.

In FIG. 6 each of the encoded outputs 80 of each encoding apparatus 50 are provided with a separate two-bit quantizer because most of the pixels are transmitted in encoded form. However, it is not necessary to supply the unencoded output 60 with an eight-bit (or other number) quantizer, because unencoded pixel values are sent out much less frequently, and the times at which they are sent out by each apparatus 50 are staggered relative to each other so that only one eight-bit quantizer need be used.

Other embodiments will occur to those skilled in the art and are within the following claims:

What is claimed is:

1. Apparatus for encoding a signal representing a two-dimensional image composed of an array of pixel values, which signal is composed of a succession of picture lines, each of which is composed of a succession of said pixel values, said apparatus comprising:

a shift register having approximately at least as many shift stages as each of said picture lines has pixel values for receiving said pixel values of said signal and for shifting each of said pixel values which it receives along its said shift stages;

subtracting means having a minuend input, at least two subtrahend inputs, and a difference output for supplying to said difference output the difference between the value supplied to said minuend input and an average of the values supplied to its said subtrahend inputs;

means for receiving from said signal and supplying to said minuend input a pixel value to be encoded;

first shift register reading means for reading a first of said pixel values from a first of said shift stages and for supplying it to a first of said subtrahend inputs said first pixel value being from the neighborhood, in said two-dimensional image, of said pixel value to be encoded and also being from the same picture line as said pixel value to be encoded;

second shift register reading means for reading at least a second of said pixel values from a second of said shift stages and supplying it to at least a second of said subtrahend inputs, said second shift stage being separated from said first shift stage by a number of shift stages approximately equal to the number of pixel values in a picture line, so that said second pixel value is from the neighborhood, in said two-dimensional image, of said pixel value to be encoded and is from a different picture line than said pixel value to be encoded.

2. Apparatus for encoding a signal according to claim 1 wherein said first pixel value is the pixel value in said signal which immediately precedes said pixel value to be encoded, wherein said second shift stage is further along said shift register from said first shift stage by a number of shift stages corresponding to one less than the number of pixel values in one picture line, and wherein said second shift register reading means also reads from said shift register and supplies to subtrahend inputs of said subtracting means a third and a fourth pixel value, which third and fourth pixel values are read from shift stages of said shift register which immediately precede and immediately succeed, respectively, said second shift stage.

3. Apparatus for encoding a signal according to claim 1, further comprising a charge-coupled device area register which supplies said succession of picture lines of said signal to said shift register.

4. Apparatus for encoding a signal according to claim 3 wherein said shift register is a charge-coupled device.

5. Apparatus for decoding a signal which is divided into a sequence of picture lines, each of which corresponds to a successive line of original pixel values taken from a two-dimensional image, which original pixel values have been encoded into corresponding encoded pixel values, said apparatus comprising:

adding means, having as encoded value input, at least two decoded value inputs, and an output, for successively producing a sum of a value supplied to said encoded value input and of an average of values supplied to said decoded value inputs and for successively supplying said sum to said output as a decoded value;

means for receiving a given encoded pixel value to be decoded and supplying it to said encoded value input of said adding means;

a shift register, having a shifting input at which it receives said decoded values from the output of said adding means and having approximately at least as many shift stages as each of said picture lines has encoded pixel values, for serially receiving said successive decoded values and for shifting each of said successive decoded values along said shift stages;

first shift register reading means for reading a first of said decoded values from a first of said shift stages located near said shifting input and for supplying said first decoded value to a first of said decoded value inputs of said adding means; and second shift register reading means for reading a second of said decoded values from a second of said shift stages, which second shift stage is removed from said first shift stage by approximately the same number of shift stages as there are encoded pixel values in one of said picture lines and for supplying said second decoded value to a second of said decoded value inputs of said adding means so that each of said successively decoded values of said adding means represents a reconstructed pixel value corresponding to an encoded pixel value to be decoded.

6. Apparatus for decoding a signal according to claim 5 wherein said first reconstructed pixel value represents a pixel value corresponding to an encoded pixel value which immediately precedes said given encoded pixel value to be decoded, wherein said second shift stage is further along said shift register from said first shift stage by a number of shift stages corresponding to one less than the number of encoded pixel values in one picture line, and wherein said second shift register reading means also reads from said shift register and supplies to decoded value inputs of said adding means a third and a fourth decoded value, which third and fourth decoded values are read from shift stages of said shift register which immediately precede and immediately succeed, respectively, said second shift stage.

7. A method of encoding a signal representing a two-dimensional image composed of an array of pixel values, which signal is composed of a succession of picture lines, each of which is composed of a succession of said pixel values, said method comprising the steps of:

receiving said pixel values of said signal in a shift register having at least as many shift stages as each of said picture lines has pixel values;

receiving from said signal a pixel value to be encoded;

reading a first of said pixel values from a first of said shift stages of said shift register, said first of said pixel values being from the neighborhood, in said two-dimensional image, of said pixel value to be encoded and also being from the same picture line as said pixel value to be encoded;

reading a second or more of said pixel values from a second or more of said shift stages with each of said second or more shift stages being separated from said first shift stage by a number of shift stages approximately equal to the number of pixel values in a picture line, so that said second or more of said pixel values are from the neighborhood, in said two-dimensional image, of said pixel value to be encoded and are from a different picture line than said pixel value to be encoded;

computing the average of the first of said pixel values and the second or more of said pixel values;

subtracting from said pixel value to be encoded the average of the first of said pixel values and the second or more of said pixel values; and outputting the result of said subtraction as the encoded representation of said pixel signal value to be encoded.

* * * * *